(12) United States Patent
Barth et al.

(10) Patent No.: US 7,291,007 B2
(45) Date of Patent: Nov. 6, 2007

(54) VALVE RING GATE FOR THERMOPLASTIC AND THERMOSET INJECTION MOLDING

(75) Inventors: David Michael Barth, Northfield, NH (US); Edward Hosung Park, Saline, MI (US); Johannis Adriaan Jan Geelhoed, Spencer, IA (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 273 days.

(21) Appl. No.: 11/101,343

(22) Filed: Apr. 7, 2005

(65) Prior Publication Data

US 2006/0228441 A1   Oct. 12, 2006

(51) Int. Cl.
*B29C 45/22* (2006.01)
(52) U.S. Cl. ...................... 425/564; 425/566
(58) Field of Classification Search ............... 425/562, 425/563, 564, 565, 566
See application file for complete search history.

(56) References Cited

U.S. PATENT DOCUMENTS

| | | | |
|---|---|---|---|
| 4,017,242 A | | 4/1977 | Mercer |
| 4,186,161 A | | 1/1980 | Ulmschneider et al. |
| 4,212,627 A | * | 7/1980 | Gellert ........................ 425/564 |
| 4,529,372 A | | 7/1985 | Saumsiegle |
| 4,705,473 A | * | 11/1987 | Schmidt ..................... 425/566 |
| 4,832,592 A | | 5/1989 | Saumsiegle |
| 5,009,587 A | | 4/1991 | Corvaglia et al. |
| 5,032,078 A | * | 7/1991 | Benenati ..................... 455/570 |
| 5,501,594 A | | 3/1996 | Glozer et al. |
| 5,820,899 A | | 10/1998 | Gellert et al. |
| 6,056,536 A | | 5/2000 | Schad et al. |
| 6,146,123 A | | 11/2000 | Lausenhammer et al. |
| 6,149,417 A | | 11/2000 | Lausenhammer et al. |
| 6,355,197 B1 | | 3/2002 | Lausenhammer et al. |
| 6,645,417 B1 | | 11/2003 | Grove |
| 6,713,002 B2 | * | 3/2004 | Kazmer et al. ............. 425/564 |
| 2003/0012845 A1 | * | 1/2003 | Doyle et al. ................ 425/562 |

* cited by examiner

*Primary Examiner*—Tim Heitbrink
(74) *Attorney, Agent, or Firm*—Harness, Dickey & Pierce, P.L.C.

(57) ABSTRACT

An injection molding machine having a first mold portion and a second mold portion. The second mold portion being movable relative to the first mold portion and together defining a mold cavity. The injection molding machine includes a fluid path extending through the first mold portion. The fluid path has an inlet and a radially continuous, downwardly-extending, circumferential outlet in fluid communication with the mold cavity. The injection molding machine further having a valve ring movably coupled in the first mold portion. The valve ring includes a downwardly extending rim portion substantially disposed within the fluid path. The valve ring is positionable in a closed position where the rim portion engages the circumferential outlet to obstruct flow of the molding material from the fluid path to the mold cavity and an opened position where the rim portion is spaced apart from the circumferential outlet to permit flow of the molding material from the fluid path to the mold cavity. The injection molding machine further includes a heating assembly in thermal communication with at least a portion of the fluid path to maintain the molding material in an uncured state for thermoset rubbers and plastics, and in a molten state for thermoplastics.

19 Claims, 3 Drawing Sheets

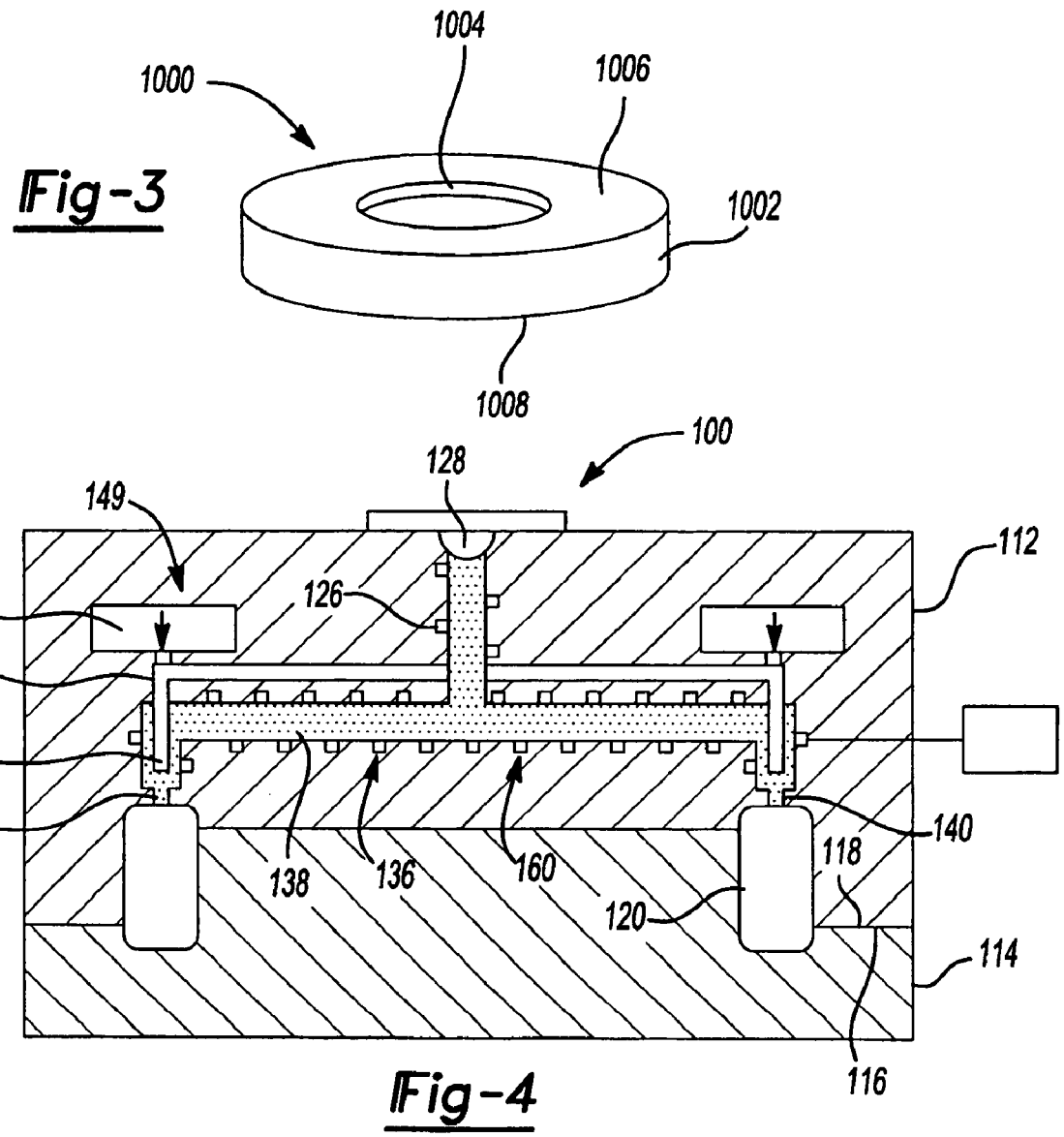
*Fig-3*
*Fig-4*
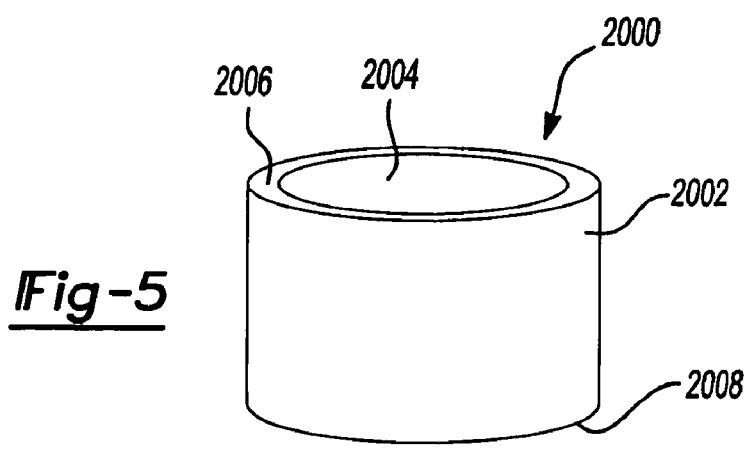
*Fig-5*

VALVE RING GATE FOR THERMOPLASTIC AND THERMOSET INJECTION MOLDING

FIELD OF THE INVENTION

The present invention relates to injection molding and, more particularly, relates to injection molding using a valve ring gate.

BACKGROUND OF THE INVENTION

As is widely known, injection molding of thermoplastic materials is often used to form a variety of parts having intricate shapes and requiring close dimensional tolerances. Such injection molding may be accomplished using a wide variety of materials, such as thermoset plastics, rubber, or similar materials.

Many conventional injection molding machines employ a stationary plastic extruder operable to pass a material through a series of runners to one or a plurality of mold cavities. These mold cavities are formed between a pair of separable mold dies and are shaped to closely conform to a predetermined shape. A sprue and a plurality of runners are used to channel material to each mold cavity. That is, once the mold dies are closed, the extruder is actuated to inject a "shot" of material (i.e. plastic or rubber) into the sprue, runners, and mold cavities. After the material has had sufficient time to solidify, the mold dies are separated and the parts ejected therefrom. Generally, when the parts are ejected from the mold dies, the runners and sprue associated therewith are also ejected coupled with the molded parts. The solidified runner and sprue material must be separated from the molded parts and finally discarded. In some instances, this discarded material may be recycled back into the manufacturing process. However, often times, customer requirements limit the amount of recycled material that may be used. As should be appreciated, when molding small parts with relatively large sprue and runner channels, the amount of discarded material can often exceed the amount of material that is permitted to be recycled. Therefore, this excess material may not be reused. This leads to increased costs associated with wasted material and disposal of the wasted material.

Similarly, it is often necessary to perform further machining of the formed parts to achieve the desired surface treatments at these gating locations. The removing of the sprue and runners material and machining is typically necessary to achieve the desired final quality. Thus, it is desirable to select a location for the gating to minimize the need for post-molding machining, yet maintain proper material flow. This is particularly necessary in the forming of ring seals and cylindrical sleeves.

One attempt to simplify injection molding of thermoplastic parts has been the use of "hot runner" systems wherein the runners from the plastic extruder to the mold cavity are maintained at an elevated temperature. With this system, the plastic in the runners is maintained above the melting temperature with only the plastic in the mold cavity being solidified. Thus, only the parts are ejected from the mold cavity with substantially no runners to remove therefrom. The step of removing the sprues and runners from the finished parts is substantially eliminated with this system.

Accordingly, there exists a need in the relevant art to provide an injection molding machine that is capable of minimizing the amount of waste material produced during manufacturing. Additionally, there exists a need in the relevant art to provide an injection molding machine that is capable of minimizing the need for post-molding machining. In particular, there exists a need in the relevant art to provide an injection molding capable of gating a cylindrical part to minimize the need for post-molding machining. Finally, there exists a need in the relevant art to overcome the disadvantages of the prior art.

SUMMARY OF THE INVENTION

According to the principles of the present invention, an injection molding machine is provided having an advantageous construction. The injection molding machine includes a first mold portion and a second mold portion. The second mold portion being movable relative to the first mold portion and together defining a mold cavity. The injection molding machine includes a fluid path extending through the first mold portion. The fluid path has an inlet and a radially continuous, downwardly-extending, circumferential outlet in fluid communication with the mold cavity. The injection molding machine further having a valve ring movably coupled in the first mold portion. The valve ring includes a downwardly extending rim portion substantially disposed within the fluid path. The valve ring is positionable in a closed position where the rim portion engages the circumferential outlet to obstruct flow of the molding material from the fluid path to the mold cavity and an opened position where the rim portion is spaced apart from the circumferential outlet to permit flow of the molding material from the fluid path to the mold cavity. The injection molding machine further includes a heating assembly in thermal communication with at least a portion of the fluid path to maintain the molding material in an uncured state.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a perspective view of a molded member being formed in the accordance with the first embodiment of the present invention;

FIG. 4 is a schematic cross-sectional view illustrating an injection molding machine according to a second embodiment of the present invention; and FIG. 5 is a perspective view of a molded member being formed in the accordance with the second embodiment of the present invention.

DETAILED DESCRIPTION OF THE PREFERRED EMBODIMENTS

The following description of the preferred embodiments is merely exemplary in nature and is in no way intended to limit the invention, its application, or uses.

Figure 1:
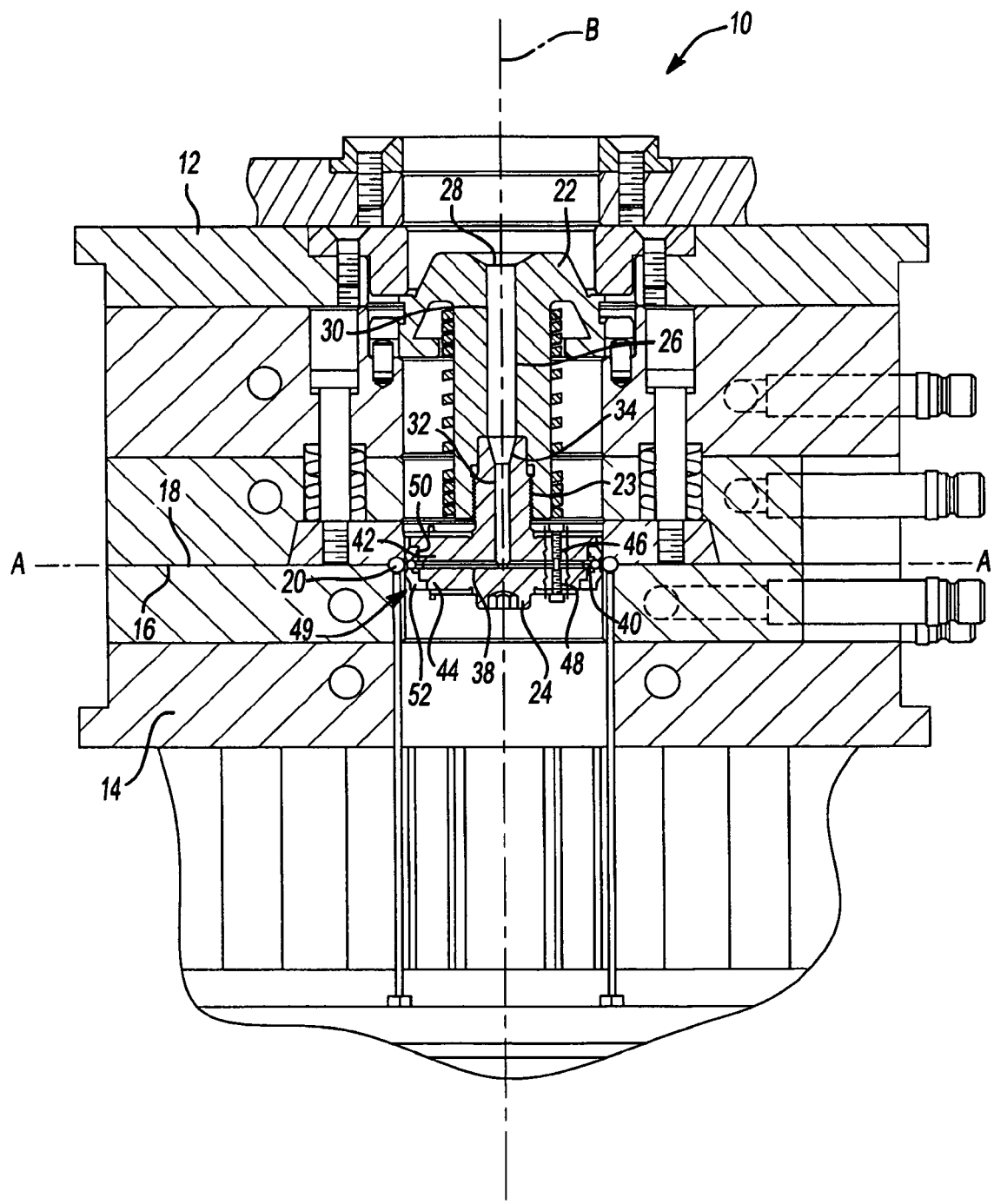
FIG. 1 is a front cross-sectional view illustrating an injection molding machine according to a first embodiment of the present invention.
Figure 2:
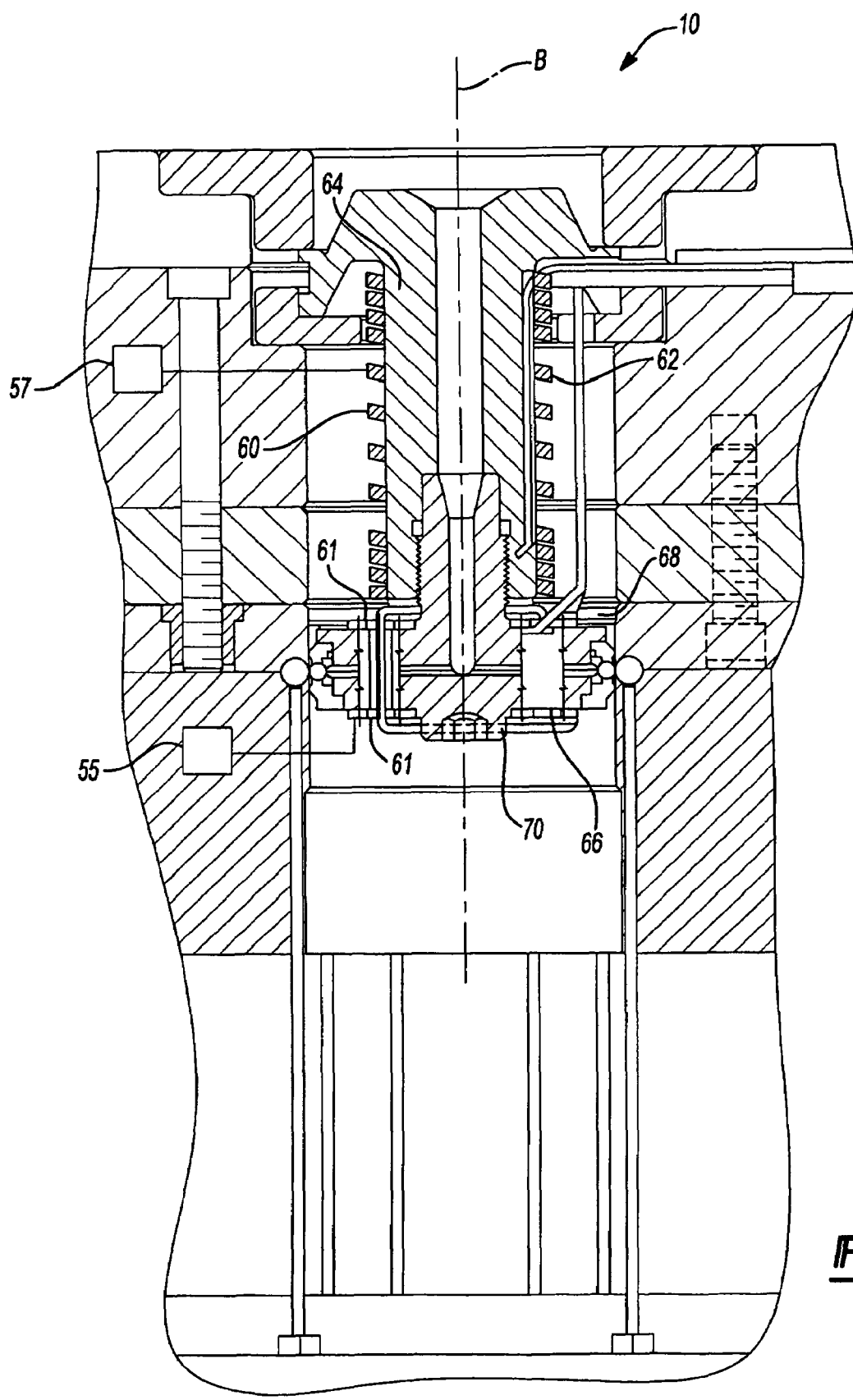
FIG. 2 is a side cross-sectional view illustrating the injection molding machine according to the first embodiment of the present invention.

Referring now to FIGS. 1 and 2, an injection molding machine 10 is provided for forming a molded member 1000. With regard to FIGS. 1-3, molded member 1000 is an O-ring. However, it should be understood that the principles of the present invention are equally applicable to a wide variety of parts and, thus, the present description should not be read to limit the scope of the present invention to any one particular product or part.

Briefly, as seen in FIG. 3, molded member 1000 is generally circular having an outer diameter portion 1002, an inner diameter portion 1004, a top portion 1006, and a bottom portion 1008. Each of these portions may intersect at a corner (as illustrated) or may be blended together such that no discernable edge is present. In the present embodiment, it is assumed that molded member 1000 is to be used in such a way that top portion 1006 and bottom portion 1008 each engage a surface to define a sealing engagement. Therefore, it is desirable that top portion 1006 and bottom portion 1008 are free from defects, including gates, flow boundaries, and the like.

Injection molding machine 10 generally includes a first mold section 12 and a second mold section 14. First mold section 12 is movable relative to second mold section 14 along a straight path (generally vertical in FIGS. 1 and 2) and between an operative or closed position (see FIGS. 1 and 2), wherein a surface 16 of first mold section 12 abuts a surface 18 of second mold section 14 along a plane A, and an inoperative or opened position, wherein surface 16 of first mold section 12 is spaced apart from surface 18 of second mold section 14 to reveal a mold cavity 20. It should be understood that it is generally inconsequential whether first mold section 12 or second mold section 14 is movable, so long as they are movable relative to each other. Mold cavity 20 is formed to closely conform to the desired shape of molded member 1000. Mold cavity 20 may be upsized to account for material shrinkage during molding.

Still referring to FIGS. 1 and 2, injection molding machine 10 further includes a nozzle member 22 and a diaphragm member 24 fixedly coupled within first mold section 12. Diaphragm member 24 is generally an inverted T-shaped member threadedly engaged within nozzle member 22 at 23. Nozzle member 22 is generally cylindrical having a flanged top and is oriented normal to plane A and parallel to the movable path of first section 12. Nozzle member 22 and diaphragm member 24 together include a central bore 26 adapted to receive molding material therein at an inlet 28. Central bore 26 has a first portion 30 coaxially aligned with a second portion 32 along an axis B and a necking portion 34 extending therebetween. A diameter of second portion 32 is smaller than a diameter of first portion 30 to increase the speed of the molding material therethrough.

Second portion 32 of central bore 26 terminates at and is in fluid communication with diaphragm member 24. Diaphragm member 24 defines a diaphragm volume 38 for receiving molding material therein. Diaphragm member 24 further defines a circumferential outlet 40 that radiates from a central axis B. That is, diaphragm member 24 receives molding material from central bore 26 and outputs the molding material through an unobstructed and continuous circumferential outlet 40. Circumferential outlet 40 is in fluid communication with mold cavity 20. Central bore 26, diaphragm volume 38, and circumferential outlet 40 together define a molding material fluid path.

From a molding standpoint, circumferential outlet 40 provides a number of advantages over conventional nozzled injection methods. Specifically, by having a single, continuous injection outlet 40 radiating from a central location, molding material can be uniformly distributed throughout mold cavity 20 quickly and consistently without resulting in undesirable molding seams or knit lines. Injection molding of hollow members using conventionally gated arrangements often lead to seams, knit lines, or other molding irregularities in the final part. These molding irregularities are produced when molding material is injected into the mold cavity at only separate locations. The molding material must travel around the mold cavity and meet along a backside interface. Often times, the molding material is no longer at a desirable temperature or workability and, thus, the seam or knit line where these two material flows meet is poorly formed. This seam or knit line may lead to sealing failures when using such molded O-rings or undesirable surface qualities when molding other parts. By using the unobstructed and continuous circumferential outlet 40 of the present invention, these seams or knit lines are avoided in that molding material flow does not a meet at an interface nor must travel farther than the thickness of the part to be molded.

As can be seen in FIGS. 1 and 2, by virtue of diaphragm volume 38 and circumferential outlet 40, diaphragm member 24 is divided into an upper half 42 and a lower half 44. Upper half 42 of diaphragm member 24 is coupled with lower half 44 via a plurality of fastening assemblies 46 spaced radially about axis B so that both upper half 42 and lower half 44 are carried by first mold section 12. As best seen in FIG. 1, each fastening assembly 46 may include a through member 48, such as a threaded fastener, extending from upper half 42 to lower half 44 to couple upper half 42 and lower half 44 together. It should be appreciated that each fastening assembly 46 is positioned sufficiently inboard relative to circumferential outlet 40 to minimize any flow disturbances to the molding material. In other words, as seen in FIG. 1, fastening assemblies 46 interrupt diaphragm volume 38 and thus interrupt the flow of the molding material passing through diaphragm volume 38 to circumferential outlet 40. Fastening assemblies 46 are positioned sufficiently inboard such that molding material flows around each fastening assembly 46 and rejoins and again mixes downstream thereof prior to enter mold cavity 20. Sufficient distance remains downstream of fastening assemblies 46 to ensure the molding material does not degrade to a level that might affect the final quality of molding member 1000. This arrangement reduces the occurrence of flow problems that might lead to knit boundaries or failures.

Injection molding machine 10 still further includes a gating device 49 having a first gate ring 50 and a second gate ring 52 positioned above and below circumferential outlet 40, respectively. First gate ring 50 and second gate ring 52 are generally circular and continuous. First gate ring 50 and second gate ring 52 are movable relative to each other to control the flow of molding material from circumferential outlet 40. First gate ring 50 and second gate ring 52 are positionable in an opened position to permit the flow of molding material from diaphragm volume 38 to mold cavity 20 and a closed position to obstruct the flow of molding material from diaphragm volume 38 to mold cavity 20 via a control system 55. Therefore, first gate ring 50 and second gate ring 52 serve to control the flow of molding material being introduced into mold cavity 20. As should be appreciated, gating device 49 is positioned closely to a boundary of mold cavity 20 to minimize any excess material that may need to be removed in post-molding processing. Additionally, by positioning gating device 49 adjacent the boundary of mold cavity 20, molding material waste may be minimized and/or eliminated.

To maintain the molding material in an uncured state, injection molding machine 10 further includes a heating or cooling device for controlling the heat within central bore 26 and diaphragm volume 38. In this regard, injection molding machine 10 is adapted to be used with either material cured through cooling (i.e. thermoplastic) or material cured through heating (i.e. thermoset plastic). As seen in FIGS. 1 and 2, injection molding machine 10 includes a first heating assembly 60 and a second heating assembly 61. First heating assembly 60 is preferably a square coil heater 62, however other heating or cooling devices may be used. First heating assembly 60 generally surrounds an elongated length 64 of nozzle member 22 and is in thermal contact therewith to provide sufficient heat to central bore 26. When using thermoplastics, such heat maintains the thermoplastic within central bore 26 in a molten and flowable state. First heating assembly 60 is controllable to maintain a desired temperature within central bore 26 via a control system 57. It should be understood that first heating assembly 60 may be a cooling element that is capable of cooling central bore 26 to maintain a heat-curable material in a flowable state.

Second heating assembly 61 is preferably a plurality of plate heaters 66 positioned generally adjacent and along upper half 42 and lower half 44 of diaphragm member 24. The plurality of plate heaters 66 is generally mounted along a backside portion 68 of upper half 42 and a backside portion 70 of lower half 44 and is in thermal contact therewith to provide sufficient heat to diaphragm volume 38. It should be realized that other heating element devices may be used. When using thermoplastics, such heat maintains the thermoplastic within diaphragm volume 38 in a molten and flowable state. Second heating assembly 61 is controllable to maintain a desired temperature within diaphragm volume 38 via control system 57. It should again be understood that second heating assembly 61 may be a cooling element that is capable of cooling diaphragm volume 38 to maintain a heat-curable material in a flowable state.

As will be appreciated by one skilled in the art, first heating assembly 60 and second heating assembly 61 provide a number of advantages when combined with circumferential outlet 40 and gating device 49. Specifically, gating device 49 and heating assemblies 60, 61 together serve to provide a means to adequately maintain the molding material in a uncured state and eliminate material waste, while circumferential outlet 40 minimizes and/or eliminates seams, knit lines, and molding irregularities.

Turning now to FIGS. 4 and 5, an injection molding machine 100 is provided for forming a molded member 2000. With regard to FIGS. 4 and 5, molded member 2000 is a cylindrical wear ring. Briefly, molded member 2000 is generally circular having an outer diameter portion 2002, an inner diameter portion 2004, a top portion 2006, and a bottom portion 2008. Each of these portions may intersect at a corner (as illustrated) or may be blended together such that no discernable edge is present. In the present embodiment, it is assumed that molded member 2000 is to be used in such a way that inner diameter portion 2004 engages a moving member to define a seal. Therefore, it is desirable that inner diameter portion 2004 is free from defects, including gates, flow boundaries, and the like.

Injection molding machine 100 generally includes a first mold section 112 and a second mold section 114, each schematically illustrated. First mold section 112 is movable relative to second mold section 114 along a straight path (generally vertical in FIG. 4) and between an operative or opened position (see FIG. 4), wherein a surface 116 of first mold section 112 abuts a surface 118 of second mold section 114 along a plane A, and an inoperative or opened position, wherein surface 116 of first mold section 112 is spaced apart from surface 118 of second mold section 114 to reveal a mold cavity 120. Mold cavity 120 is formed to closely conform to the desired shape of molded member 2000.

Still referring to FIG. 4, injection molding machine 100 further includes a central bore 126 adapted to receive molding material therein at an inlet 128. Central bore 126 terminates at and is in fluid communication with a diaphragm 136. Diaphragm 136 defines a diaphragm volume 138 for receiving molding material therein. Diaphragm 136 further defines a circumferential outlet 140. That is, diaphragm 136 receives molding material from central bore 126 and outputs the molding material through an unobstructed and continuous circumferential outlet 140. Circumferential outlet 140 is in fluid communication with mold cavity 120 along top portion 1006 of molded member 2000.

Similar to circumferential outlet 40, circumferential outlet 140 provides a number of advantages over conventional nozzled injection methods. Specifically, by having a single, continuous injection outlet 140, molding material can be uniformly distributed throughout mold cavity 120 quickly and consistently without resulting in undesirable molding seams or knit lines. These seams or knit lines are avoided because the molding material flow does not a meet at an interface nor must travel farther than the thickness of the part to be molded.

Injection molding machine 100 still further includes a gating device 149 having a valve ring 150 positioned above circumferential outlet 140. Valve ring 150 is movable relative to circumferential outlet 140 to control the flow of molding material through circumferential outlet 140. Valve ring 150 is positionable in an opened position to permit the flow of molding material from diaphragm volume 138 to mold cavity 120 through circumferential outlet 140 and a closed position to obstruct the flow of molding material from diaphragm volume 138 to mold cavity 120. Therefore, valve ring 150 serves to control the flow of molding material being introduced into mold cavity 120. Movement of valve ring 150 between the opened position and the closed position is control via an actuating device 153. Actuating device 153 may include any actuating device, such as pneumatic actuator, a hydraulic actuator, a solenoid, and the like. As should be appreciated, a rim 152 of gating device 149 is positioned closely to a boundary of mold cavity 120 to minimize any excess material that may need to be removed in post-molding processing. Additionally, by positioning rim 152 of gating device 149 adjacent the boundary of mold cavity 120, molding material waste may be minimized and/or eliminated.

To maintain the molding material in an uncured state, injection molding machine 100 further includes a heating or cooling device for controlling the heat within central bore 126 and diaphragm volume 138. As seen in FIG. 4, injection molding machine 100 includes a heating assembly 160. Heating assembly 160 may be a square coil heater, plate heater, or any conventional heating device. As illustrated, heating assembly 160 generally surrounds central bore 126 and diaphragm volume 38. When using thermoset plastics, applying heat maintains the thermoset plastic within central bore 126 and diaphragm volume 38 in a molten and flowable state. Heating assembly 160 is controllable to maintain a desired temperature within central bore 126 and diaphragm volume 38. It should be understood that heating assembly 160 may be a cooling element that is capable of cooling central bore 126 and diaphragm volume 38 to maintain a heat-curable material in a flowable state.

As will be appreciated by one skilled in the art, heating assembly 160 provides a number of advantages when combined with circumferential outlet 140 and gating device 149. Specifically, gating device 149 and heating assembly 160 together serve to provide a means to adequately maintain the molding material in a uncured state and eliminate material waste, while circumferential outlet 140 minimizes and/or eliminates seams and knit lines.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An injection molding machine comprising:
   a first mold portion;
   a second mold portion movable relative to said first mold portion, said first mold portion and said second mold portion together defining a mold cavity;
   a fluid path extending through said first mold portion for receiving molding material, said fluid path having an inlet and a radially continuous, downwardly-extending, circumferential outlet, said circumferential outlet being in fluid communication with said mold cavity;
   a valve ring movably coupled in said first mold portion, said valve ring having a downwardly extending rim portion substantially disposed within said fluid path, said valve ring positionable in a closed position where said rim portion engages said circumferential outlet to obstruct flow of the molding material from said fluid path to said mold cavity and an opened position where said rim portion is spaced apart from said circumferential outlet to permit flow of the molding material from said fluid path to said mold cavity; and
   a heating assembly in thermal communication with at least a portion of said fluid path, said heating assembly maintaining the molding material in an uncured state for thermoset rubbers and plastics, and in a molten state for thermoplastics.

2. The injection molding machine according to claim 1 wherein said fluid path comprises:
   a central bore disposed in said first mold portion, said central bore being operable to receive the molding material; and
   a diaphragm member disposed in said first mold portion, said diaphragm member having a diaphragm volume in fluid communication with said central bore and having said circumferential outlet.

3. The injection molding machine according to claim 2 wherein said diaphragm member comprises:
   an upper portion;
   a lower portion; and
   a plurality of fastening assemblies coupling said upper portion and said lower portion, said plurality of fastening assemblies each extending through said diaphragm volume, said plurality of fastening assemblies being spaced from said circumferential outlet so as to not substantially obstruct the flow of the molding material exiting said circumferential outlet.

4. The injection molding machine according to claim 3 wherein said heating assembly comprises:
   a first heating plate disposed on said upper portion of said diaphragm member; and
   a second heating plate disposed on said lower portion of said diaphragm member.

5. The injection molding machine according to claim 2 wherein said heating assembly comprises:
   a first heating element surround said central bore and being in thermal communication with said central bore; and
   a second heating element in thermal communication with said diaphragm volume.

6. The injection molding machine according to claim 1, further comprising:
   an actuation device actuating said valve ring between said opened position and said closed position.

7. The injection molding machine according to claim 6 wherein said actuation device is chosen from the group consisting essentially of a pneumatic actuator, a hydraulic actuator, and a solenoid.

8. The injection molding machine according to claim 1 wherein said heating assembly comprises:
   a heating element in thermal communication with said fluid path for delivering heat to said fluid path.

9. The injection molding machine according to claim 1 wherein said heating assembly comprises:
   a cooling element in thermal communication with said fluid path for removing heat from said fluid path.

10. The injection molding machine according to claim 1 wherein said rim portion of said valve ring is positioned immediately adjacent said mold cavity in said closed position.

11. An injection molding machine comprising:
    a first mold portion;
    a second mold portion movable relative to said first mold portion, said first mold portion and said second mold portion together defining a mold cavity;
    a fluid path having a central bore extending through said first mold portion for receiving molding material in fluid communication with a diaphragm volume, said fluid path having an inlet and a radially continuous, downwardly-extending, circumferential outlet, said circumferential outlet being in fluid communication with said diaphragm volume and said mold cavity;
    a valve ring movably coupled in said first mold portion, said valve ring having a downwardly extending rim portion substantially disposed within said fluid path, said valve ring positionable in a closed position where said rim portion engages said circumferential outlet to obstruct flow of the molding material from said fluid path to said mold cavity and an opened position where said rim portion is spaced apart from said circumferential outlet to permit flow of the molding material from said fluid path to said mold cavity; and
    a heating assembly in thermal communication with at least a portion of said fluid path, said heating assembly maintaining the molding material in an uncured state for thermoset rubbers and plastics, and in a molten state for thermoplastics.

12. The injection molding machine according to claim 11 wherein said diaphragm member comprises:
    an upper portion;
    a lower portion; and
    a plurality of fastening assemblies coupling said upper portion and said lower portion, said plurality of fastening assemblies each extending through said diaphragm volume, said plurality of fastening assemblies being spaced from said circumferential outlet so as to not substantially obstruct the flow of the molding material exiting said circumferential outlet.

13. The injection molding machine according to claim 12 wherein said heating assembly comprises:
- a first heating plate disposed on said upper portion of said diaphragm member; and
- a second heating plate disposed on said lower portion of said diaphragm member.

14. The injection molding machine according to claim 11 wherein said heating assembly comprises:
- a first heating element surround said central bore and being in thermal communication with said central bore; and
- a second heating element in thermal communication with said diaphragm volume.

15. The injection molding machine according to claim 11, further comprising:
- an actuation device actuating said valve ring between said opened position and said closed position.

16. The injection molding machine according to claim 15 wherein said actuation device is chosen from the group consisting essentially of a pneumatic actuator, a hydraulic actuator, and a solenoid.

17. The injection molding machine according to claim 11 wherein said heating assembly comprises:
- a heating element in thermal communication with said fluid path for delivering heat to said fluid path.

18. The injection molding machine according to claim 11 wherein said heating assembly comprises:
- a cooling element in thermal communication with said fluid path for removing heat from said fluid path.

19. The injection molding machine according to claim 11 wherein said rim portion of said valve ring is positioned immediately adjacent said mold cavity in said closed position.

* * * * *

UNITED STATES PATENT AND TRADEMARK OFFICE
CERTIFICATE OF CORRECTION

| | | |
|---|---|---|
| PATENT NO. | : 7,291,007 B2 | Page 1 of 1 |
| APPLICATION NO. | : 11/101343 | |
| DATED | : November 6, 2007 | |
| INVENTOR(S) | : David Michael Barth, Edward Hosung Park and Johannis Adriaan Jan Geelhoed | |

It is certified that error appears in the above-identified patent and that said Letters Patent is hereby corrected as shown below:

In col. 8, line 5, claim 5, please delete "surround" and insert --surrounding-- therefor.
In col. 9, line 9, claim 14, please delete "surround" and insert --surrounding-- therefor.

Signed and Sealed this

Twenty-ninth Day of April, 2008

JON W. DUDAS
*Director of the United States Patent and Trademark Office*